(12) United States Patent
Lu

(10) Patent No.: US 9,122,261 B2
(45) Date of Patent: Sep. 1, 2015

(54) APPARATUS AND METHOD FOR REAL-TIME SEQUENTIAL QUADRATIC PROGRAMMING IN INDUSTRIAL PROCESS CONTROL SYSTEMS

(75) Inventor: Joseph Z. Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 523 days.

(21) Appl. No.: 13/454,236

(22) Filed: Apr. 24, 2012

(65) Prior Publication Data

US 2013/0282146 A1 Oct. 24, 2013

(51) Int. Cl.
*G05B 13/02* (2006.01)
*G05B 19/042* (2006.01)

(52) U.S. Cl.
CPC ..................................... *G05B 19/042* (2013.01)

(58) Field of Classification Search
USPC .............................. 700/29; 375/296; 324/500
See application file for complete search history.

(56) References Cited

U.S. PATENT DOCUMENTS

| | | | |
|---|---|---|---|
| 5,351,184 A | 9/1994 | Lu et al. | |
| 5,561,599 A | 10/1996 | Lu | |
| 5,572,420 A | 11/1996 | Lu | |
| 5,574,638 A | 11/1996 | Lu | |
| 5,758,047 A | 5/1998 | Lu et al. | |
| 6,055,483 A | 4/2000 | Lu | |
| 6,122,555 A | 9/2000 | Lu | |
| 2002/0072828 A1* | 6/2002 | Turner et al. | 700/269 |
| 2002/0158636 A1* | 10/2002 | Tyan et al. | 324/500 |
| 2003/0120361 A1* | 6/2003 | Anderson et al. | 700/31 |
| 2004/0133616 A1* | 7/2004 | Manevitz et al. | 708/443 |
| 2004/0158339 A1* | 8/2004 | Kawase et al. | 700/97 |
| 2006/0136275 A1* | 6/2006 | Cotora | 705/7 |
| 2006/0142886 A1* | 6/2006 | Ishibashi et al. | 700/99 |
| 2007/0050070 A1* | 3/2007 | Strain et al. | 700/99 |
| 2007/0083281 A1* | 4/2007 | Chen et al. | 700/100 |
| 2007/0260335 A1* | 11/2007 | Fan et al. | 700/29 |
| 2008/0172280 A1* | 7/2008 | Goulimis | 705/8 |
| 2008/0215386 A1* | 9/2008 | Eder | 705/7 |
| 2009/0187265 A1 | 7/2009 | Wan et al. | |
| 2011/0040399 A1 | 2/2011 | Lu | |
| 2011/0135034 A1* | 6/2011 | Mujica et al. | 375/296 |
| 2012/0239167 A1* | 9/2012 | Carrette | 700/52 |

* cited by examiner

*Primary Examiner* — Michael D Masinick
*Assistant Examiner* — Anthony Whittington

(57) ABSTRACT

A method includes identifying a nonlinear model used by an optimizer to perform optimization operations associated with an industrial process to be controlled. The method also includes generating a Hessian matrix associated with the nonlinear model. The method further includes providing the Hessian matrix to an advanced process controller that uses the Hessian matrix to perform both process control and optimization operations. The Hessian matrix can approximate a nonlinear objective function. The method can also include providing one or more approximated nonlinear constraints, a solution of a quadratic sub-problem that approximates the nonlinear model, or a combination of multiple solutions of the quadratic sub-problem to the advanced process controller. The Hessian matrix can be updated and provided to the advanced process controller during each of multiple iterations. During each iteration, the industrial process can be adjusted to move an operating point of the industrial process towards an optimal ending position.

20 Claims, 5 Drawing Sheets

APPARATUS AND METHOD FOR REAL-TIME SEQUENTIAL QUADRATIC PROGRAMMING IN INDUSTRIAL PROCESS CONTROL SYSTEMS

TECHNICAL FIELD

This disclosure relates generally to industrial process control systems. More specifically, this disclosure relates to an apparatus and method for real-time sequential quadratic programming in industrial process control systems.

BACKGROUND

Processing facilities are often managed using process control systems. Example processing facilities include manufacturing plants, chemical plants, crude oil refineries, and ore processing plants. Among other operations, process control systems typically manage the use of motors, valves, pumps, and other actuators or industrial equipment in the processing facilities.

Many industrial process control systems include multiple hierarchical layers that perform different functions. For example, lower layers could include devices that perform advanced process control (APC) and optimization operations, while higher layers could include devices that perform planning and/or scheduling operations. Unfortunately, different hierarchical layers often include different types of models and use different constraints on an industrial process. It is therefore often not easy (and sometimes extremely difficult) to keep models and constraints consistent between different layers of an industrial process control system. Inconsistent models or constraints can often prevent an optimal control solution from being implemented in a processing facility. This can have various disadvantages, including monetary losses.

SUMMARY

This disclosure provides an apparatus and method for real-time sequential quadratic programming in industrial process control systems.

In a first embodiment, a method includes identifying a nonlinear model used by an optimizer to perform optimization operations associated with an industrial process to be controlled. The method also includes generating a Hessian matrix associated with the nonlinear model. The method further includes providing the Hessian matrix to an advanced process controller that uses the Hessian matrix to perform both process control and optimization operations.

In a second embodiment, an apparatus includes at least one memory configured to store a nonlinear model used by an optimizer to perform optimization operations associated with an industrial process to be controlled. The apparatus also includes at least one processing device configured to generate a Hessian matrix associated with the nonlinear model and provide the Hessian matrix to an advanced process controller that uses the Hessian matrix to perform both process control and optimization operations.

In a third embodiment, a computer readable medium embodies a computer program. The computer program includes computer readable program code for identifying a nonlinear model used by an optimizer to perform optimization operations associated with an industrial process to be controlled. The computer program also includes computer readable program code for generating a Hessian matrix associated with the nonlinear model. The computer program further includes computer readable program code for providing the Hessian matrix to an advanced process controller that uses the Hessian matrix to perform both process control and optimization operations.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
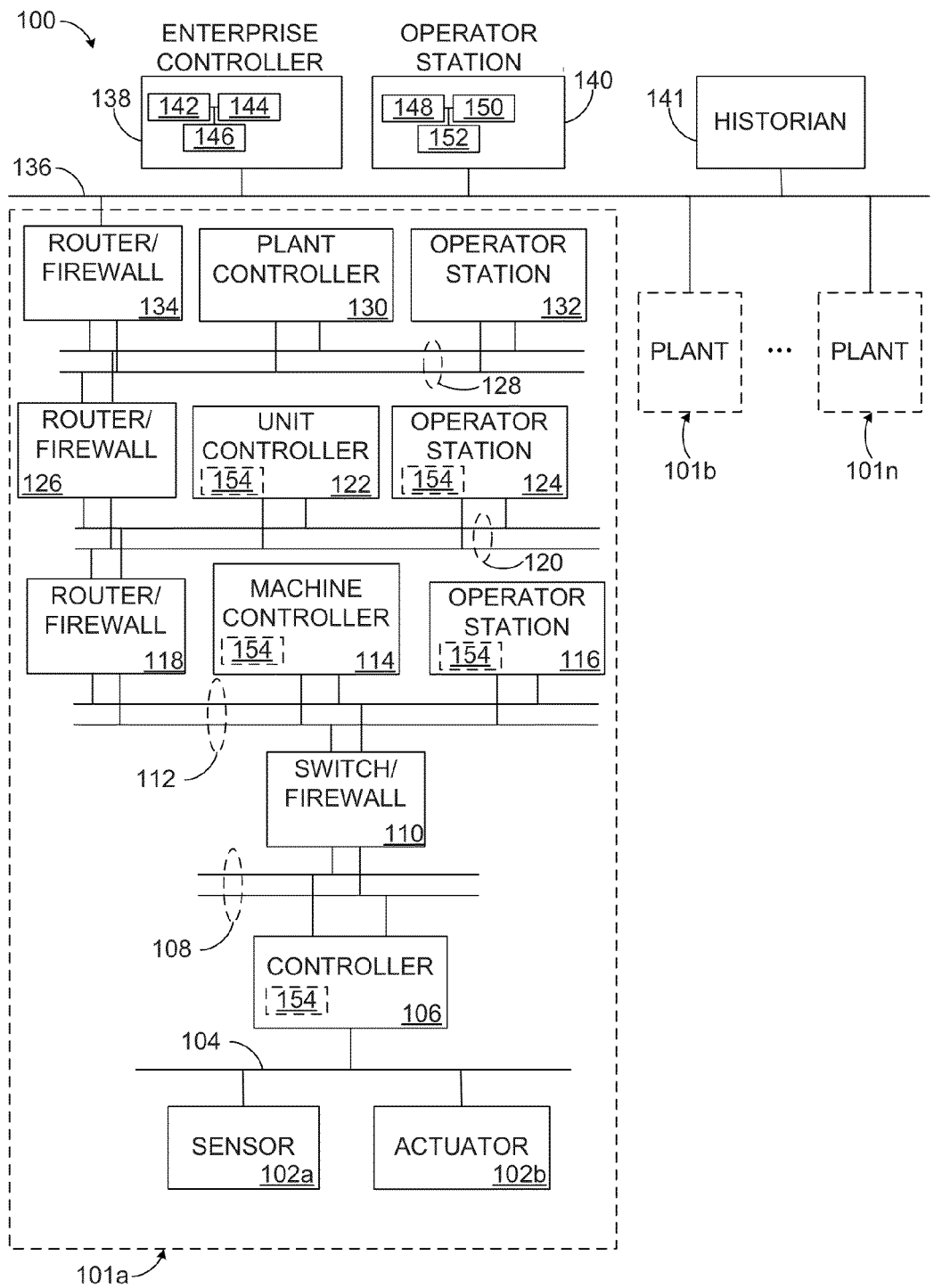
FIG. 1 illustrates an example industrial process control system according to this disclosure.

FIG. 1 illustrates an example industrial process control system 100 according to this disclosure. As shown in FIG. 1, the process control system 100 includes various components that facilitate production or processing of at least one product or other material. For instance, the process control system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the process control system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b, such as heaters, motors, or valves, could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a MICROSOFT WINDOWS operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the process control system 100. The historian 141 could, for example, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces.

As described above, different components in the process control system 100 may use different types of models or constraints for controlling an industrial process. For example, controllers that implement MPC or other APC techniques in lower levels could use linear dynamic models with constraints defined on controlled variables (variables whose values are typically controlled to be within specified ranges of values or at or near specific values). Controllers that perform real-time optimization (RTO) operations in lower levels could use nonlinear steady-state models with constraints defined within the models.

These different models and constraints raise various technical challenges in multi-unit or plant-wide dynamic optimization. For example, it is often difficult to estimate the current feasible region for optimization, meaning it is difficult to identify how much different process variables can be moved during optimization without violating any new or existing constraints dynamically. Also, it is often difficult to handle non-convexity in an objective function or the constraints. Further, transient and not-so-transient infeasibilities can arise, which can cause a feasible steady-state optimization solution to be dynamically infeasible to lower-level controllers.

In one aspect of operation, at least one component of the system 100 implements or otherwise provides an integration bridge 154. The integration bridge 154 allows both control and optimization operations to occur within at least one MPC or other APC controller (such as controllers 106). The integration bridge 154 can be implemented in one or more components of the process control system 100. For example, the integration bridge 154 could be implemented on any of the controllers 106, 114, 122 or any of the operator stations 116, 124. In general, the integration bridge 154 could be implemented on any server, real-time workstation, application or execution platform, distributed control system (DCS), real-time controller, or other suitable device or system.

Additional details regarding the integration bridge 154 are provided below. The integration bridge 154 includes any suitable structure supporting the integration of optimization operations into process controllers. The integration bridge 154 could, for example, represent a computing device having at least one processor, at least one memory, and at least one network interface (note that the processor, memory, and network interface could be the same components in an operator station or controller or different components). The integration bridge 154 could also represent a stand-alone component or a component integrated into another component, such as into a computer.

Although FIG. 1 illustrates one example of an industrial process control system 100, various changes may be made to FIG. 1. For example, a control system could include any number of sensors, actuators, controllers, servers, operator stations, networks, and integration bridges. Also, the makeup and arrangement of the process control system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which an integration bridge can be used. This functionality can be used in any other suitable device or system.

Figure 2:
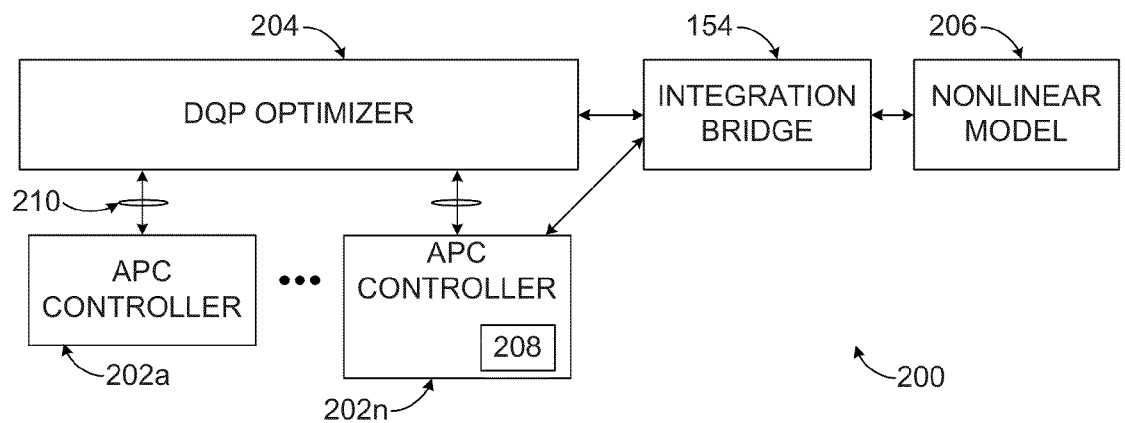
FIG. 2 illustrates an example integration of different industrial process control layers according to this disclosure.

FIG. 2 illustrates an example integration 200 of different industrial process control layers according to this disclosure. As shown in FIG. 2, various controllers 202a-202n are coupled to a real-time dynamic optimizer 204. Here, the dynamic optimizer 204 may support distributed quadratic programming and is therefore denoted as a "DQP" optimizer.

Each controller 202a-202n includes any suitable structure for controlling a process or portion thereof. For example, each controller 202a-202n could represent an RMPCT controller or other MPC or APC controller. The RMPCT control technology is described in the following U.S. patents, which are hereby incorporated by reference: U.S. Pat. No. 5,351,184; U.S. Pat. No. 5,561,599; U.S. Pat. No. 5,572,420; U.S. Pat. No. 5,574,638; and U.S. Pat. No. 5,758,047. The controllers 202a-202n could, for example, represent the controllers 106, 114, or 122 in FIG. 1.

The dynamic optimizer 204 includes any suitable structure supporting local dynamic optimization of process controllers. The dynamic optimizer 204 could, for example, implement the technology described in the following U.S. patents, which are hereby incorporated by reference: U.S. Pat. No. 6,055,483 and U.S. Pat. No. 6,122,555. The dynamic optimizer 204 could, for example, represent the controllers 122 or 130 in FIG. 1.

In FIG. 2, the integration bridge 154 communicates with the APC controllers 202a-202n and with the optimizer 204. The integration bridge 154 also has access to at least one nonlinear model 206. The nonlinear model 206 represents any suitable steady-state nonlinear model usable by an outside optimizer, which may employ forms such as:

$$\min_x f(x), f \text{ is the economic objective function}$$

subject to $$g_j(x) \le 0, j = 1, 2, \ldots m$$

$$h_k(x) = 0, k = 1, 2, \ldots p$$

which represents a steady-state nonlinear real-time optimization model with constraints. In this example, the integration bridge 154 operates between (i) the controllers 202a-202n and (ii) the DQP optimizer 204 and its associated nonlinear model(s) 206, which are mathematically represented by functions f, g, and h.

Among other things, if an outside optimizer (not depicted in FIG. 2) is used, it typically performs optimization operations and then provides optimized process variable setpoints to the controllers 202a-202n, bypassing the integration bridge 154. However, because of different models or constraints used in the multi-layer system, it is possible that process variable setpoints provided to the APC controllers are infeasible. This means that the APC controllers are unable to satisfy the process variable setpoints given their own models or process variable constraints.

The integration bridge 154 helps to alleviate this type of problem. In general, rather than merely providing setpoints from an outside optimizer to an APC controller, the integration bridge 154 provides information that allows at least one MPC or other APC controller (such as one or more of the controllers 202a-202n) to perform both control and the equivalent optimization. For example, the integration bridge 154 can provide to an APC controller information defining an essential or other portion(s) of the model 206. The portion of the model that is provided to the APC controller captures the nonlinearity of the controlled process and how that process should be optimized.

In some embodiments, the information provided by the integration bridge 154 to an APC controller can include a quadratic approximation of one or more nonlinear constraints from the model 206. The information provided by the integration bridge 154 to the APC controller can also include an approximation of a nonlinear objective function used by the optimizer. The approximation of the objective function could be provided in the form of a Hessian matrix.

An APC controller uses this information while performing its control operations. This allows the APC controller to generate control solutions that are feasible since the APC controller can consider both a nonlinear objective function and optimization constraints. In particular embodiments, each APC controller can support frequency-zero quadratic programming (QP) operations. Moreover, optimization solution collars 210 (a default option in DQP optimizers 204) can be used to resolve dynamic conflicts between optimizers and APC controllers, thereby helping to manage any transient infeasibilities. In addition, a Quasi-Newton method can be employed with Hessian and constraint updates from the integration bridge 154 to lower-level components to achieve real-time sequential quadratic programming (SQP) optimization for multi-unit or plant-wide optimization.

Although FIG. 2 illustrates one example of the integration of different industrial process control layers, various changes may be made to FIG. 2. For example, the integration bridge 154 could operate in conjunction with any number of optimizers and any number of controllers.

Figure 3A:
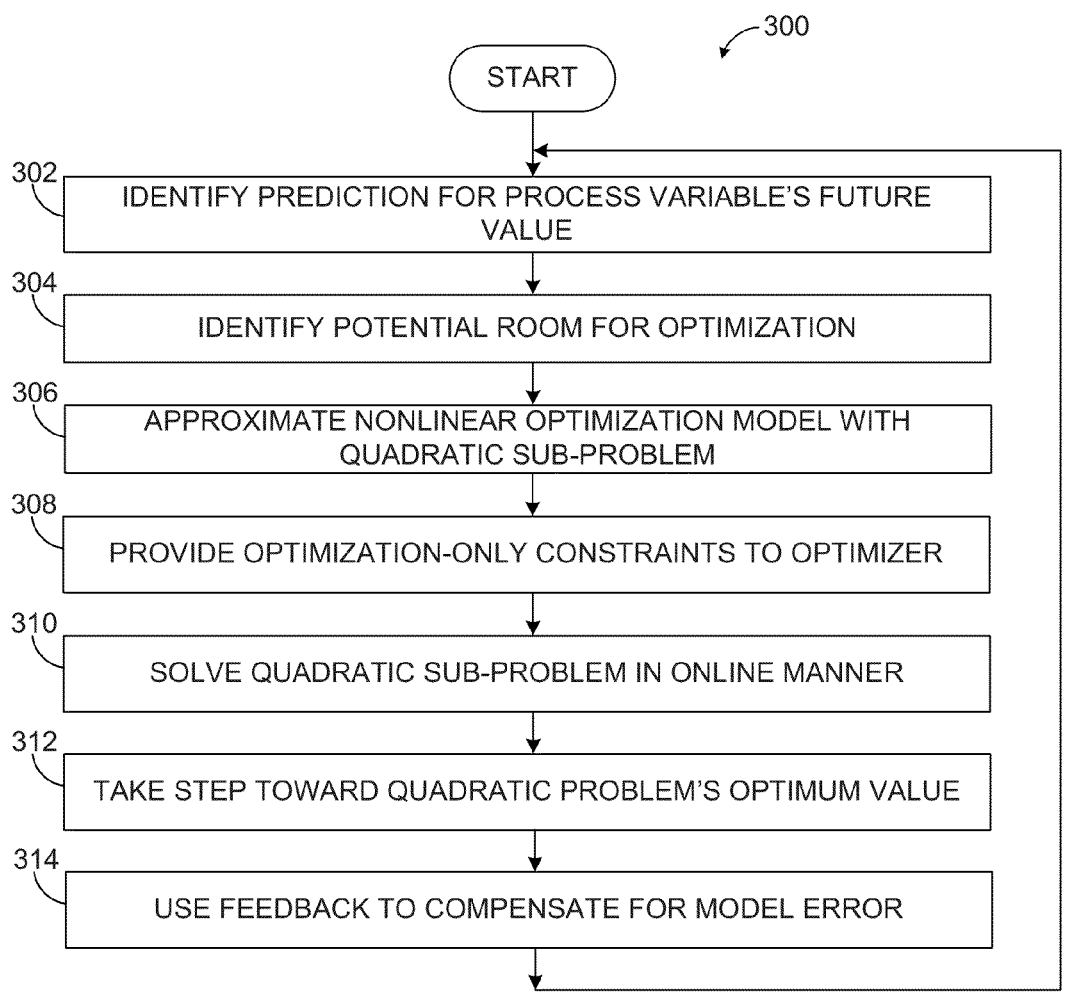
FIGS. 3A and 3B illustrate example methods for real-time sequential quadratic programming in an industrial process control system according to this disclosure.
Figure 3B:
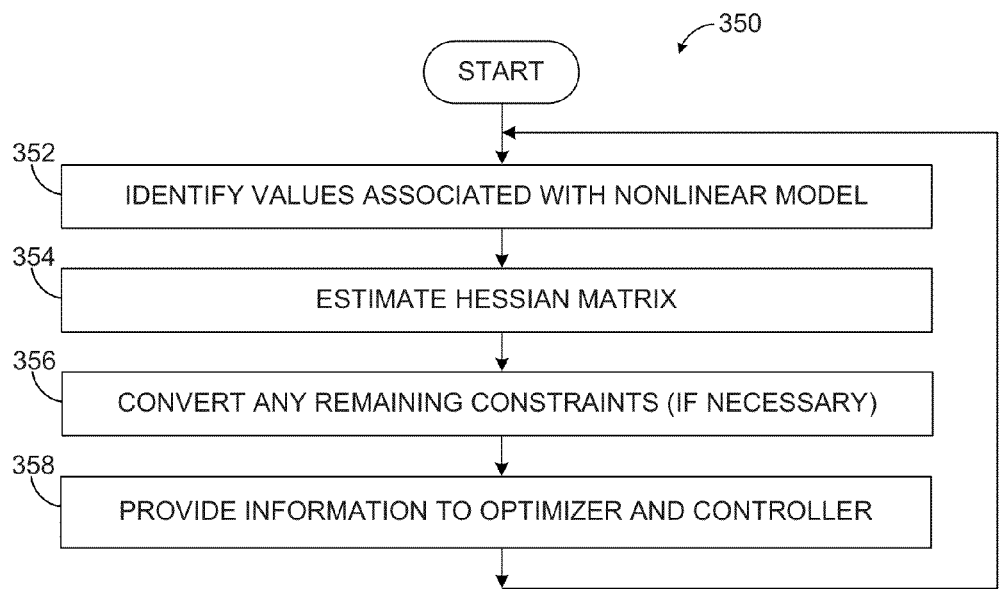

FIGS. 3A and 3B illustrate example methods for real-time sequential quadratic programming in an industrial process control system according to this disclosure. As shown in FIG. 3A, a method 300 includes identifying a prediction of a process variable's future value at step 302. This could include, for example, the integration bridge 154 calculating the process variable's future value or receiving the process variable's future value from another component, such as an APC controller or optimizer. The prediction could represent a predicted value at any suitable future time, such as four to six "tau" (meaning the prediction predicts the process variable's value at four to six mean time constants in the future). Potential room for optimization at this time horizon in the future (such as four to six tau) is identified at step 304. This could include, for example, the optimization bridge 154 identifying a difference between the process variable's predicted future value and a limit on the process variable's value (such as a high limit or a low limit).

A nonlinear optimization model is approximated with a quadratic sub-problem at step 306. This could include, for example, the integration bridge 154 using a quasi-Newton method to approximate the steady-state nonlinear optimization model 206. Example quasi-Newton methods are described below. Optimization-only constraints are provided to an optimizer at step 308. This could include, for example, the integration bridge 154 providing the constraints needed by a DQP optimizer to that optimizer. The provided constraints could represent all or a subset of the constraints.

The quadratic sub-problem is solved in an online manner at step 310, and a step is taken towards the quadratic sub-problem's optimal solution at step 312. This could include, for example, the integration bridge 154 solving the quadratic sub-problem while honoring all control and optimization constraints. This could also include the integration bridge 154 passing various information to an APC controller, which uses the information to calculate a controller move (a change to at least one variable). The information could include a Hessian matrix or an update to a Hessian matrix. The information could also include constraints associated with the nonlinear model 206 or an optimization solution calculated by a DQP optimizer. Various options available in step 312 are described below.

Feedback is used to compensate for model error at step 314. This could include, for example, the one or more APC controllers 202a-202n identifying the process variable's actual value and comparing it to a prior predicted value. This could also include the one or more APC controllers 202a-202n correcting any dynamic model prediction errors (such as in one or more models 208 used by the one or more APC controllers) for bias. This could further include the integration bridge 154 correcting any steady-state models (such as one or more models 206 used by one or more DQP optimizers) for bias or re-estimating parameters for those models. The process can then be repeated during another iteration of the method 300.

As shown in FIG. 3B, a method 350 is used to pass values associated with a nonlinear model to an optimizer or controller. Values associated with a nonlinear model are identified at step 352. This could include, for example, the integration bridge 154 identifying an input value x, an output value y, a Jacobian matrix J, and constraint values h and g associated with the nonlinear model 206. These values can be tracked by the integration bridge 154 over time.

A Hessian matrix B is estimated at step 354. This could include, for example, the integration bridge 154 estimating the Hessian matrix of a Lagrangian Function of the system being controlled. The Lagrangian Function models the dynamic behavior of the system. The estimated Hessian matrix could be determined in any suitable manner, such as by using a Quasi-Newton approximation or a reduced Quasi-Newton approximation. The Lagrangian Function may or may not be augmented.

Any remaining constraints are converted if necessary at step 356. This could include, for example, the integration bridge 154 converting constraints h, g, or other values into suitable form. As a particular example, this could include the integration bridge 154 converting any nonlinear constraints into estimated approximations of those constraints.

Various information is provided to an optimizer and a controller at step 358. This could include, for example, the integration bridge 154 providing the Hessian matrix B, the Jacobian matrix J, and the converted constraints to at least one APC controller. The same information or different information could be provided to the DQP optimizer.

In this way, the integration bridge 154 is able to inform an APC controller of optimization nonlinearities, and the APC controller can use this information during control calculations. This approach can provide various benefits depending on the implementation. For example, this approach can solve the three problems noted above, namely:

it can correctly compute the current feasible region for optimization within the prediction horizon;

it can handle non-convexity in an objective function or the constraints; and it can help to resolve situations where a feasible steady-state optimization solution is dynamically infeasible to lower-level controllers.

Also, more accurate models can be created (such as using bias correction or re-parameterization) to better align the models with the actual process. Further, optimization can be performed at any time without waiting for the underlying processes to reach steady-state, and additional robustness and global coordination of multiple APC controllers can be obtained. Moreover, the integration bridge 154 can have broad compatibility with various models. In some embodiments, only the input-output (x-y) relationships and Jacobian matrix J are needed, and the integration bridge 154 can operate with many different types of first-principle or other modeling tools via an application programming interface (API). In addition, this approach is scalable and flexible in that it allows only partial participation from downstream controllers or optimizers.

Various quasi-Newton methods are known for approximating a nonlinear system with a quadratic sub-problem. Some quasi-Newton methods can be expressed as follows:

$$f(x_k + \Delta x) \approx f(x_k) + J(x_k)^T \Delta x + \frac{1}{2} \Delta x^T B \Delta x$$

where $$J(x_k) = \frac{\partial f(x)}{\partial x}\bigg|_{x_k}, \quad y_k = J(x_{k+1}) - J(x_k)$$

And $$J(x_k + \Delta x) = J(x_k) + B \Delta x$$

| Method | $B_1 = I$, $B_{k+1} =$ | $H_{k+1} = B_{k+1}^{-1} =$ |
|---|---|---|
| DFP | $\left(I - \frac{y_k \Delta x_k^T}{y_k^T \Delta x_k}\right) B_k \left(I - \frac{\Delta x_k y_k^T}{y_k^T \Delta x_k}\right) + \frac{y_k y_k^T}{y_k^T \Delta x_k}$ | $H_k + \frac{\Delta x_k \Delta x_k^T}{y_k^T \Delta x_k} - \frac{H_k y_k y_k^T H_k^T}{y_k^T H_k y_k}$ |
| BFGS | $B_k + \frac{y_k y_k^T}{y_k^T \Delta x_k} - \frac{B_k \Delta x_k (B_k \Delta x_k)^T}{\Delta x_k^T B_k \Delta x_k}$ | $\left(I - \frac{y_k \Delta x_k^T}{y_k^T \Delta x_k}\right)^T H_k \left(I - \frac{y_k \Delta x_k^T}{y_k^T \Delta x_k}\right) + \frac{\Delta x_k \Delta x_k^T}{y_k^T \Delta x_k}$ |

-continued $$f(x_k + \Delta x) \approx f(x_k) + J(x_k)^T \Delta x + \frac{1}{2}\Delta x^T B \Delta x$$

where $$J(x_k) = \frac{\partial f(x)}{\partial x}\bigg|_{x_k}, \; y_k = J(x_{k+1}) - J(x_k)$$

And $$J(x_k + \Delta x) = J(x_k) + B\Delta x$$

| Method | $B_1 = I, B_{k+1} =$ | $H_{k+1} = B_{k+1}^{-1} =$ |
|---|---|---|
| Broyden | $B_k + \dfrac{y_k - B_k \Delta x_k}{\Delta x_k^T \Delta x_k}\Delta x_k^T$ | $H_k + \dfrac{(\Delta x_k - H_k y_k)y_k^T H_k}{y_k^T H_k \Delta x_k}$ |
| Broyden Family | $(1-\phi_k)B_{k+1}^{BFGS} + \phi_k B_{k+1}^{DFP}, \phi \in [0,1]$ | |
| SR1 | $B_k + \dfrac{(y_k - B_k \Delta x_k)(y_k - B_k \Delta x_k)^T}{(y_k - B_k \Delta x_k)^T \Delta x_k}$ | $H_k + \dfrac{(\Delta x_k - H_k y_k)(\Delta x_k - H_k y_k)^T}{(\Delta x_k - H_k y_k)^T y_k}$ |

Any of these techniques could be used during approximation of a nonlinear system and generation of a Hessian matrix.

As noted above, there are also different options for providing information to an optimizer and controller in step 358 of FIG. 3B. For example, a first option could include providing a Hessian matrix (or an update to a Hessian matrix) along with additional constraints from the nonlinear model 206. The Hessian matrix provides an approximation of a local objective function. The additional constraints can be used to provide a trust region mechanism to improve robustness and to transfer modeling information (constraints) to a real-time control-optimization scheme.

A second option could include providing a Hessian matrix (or an update to a Hessian matrix) along with the actual optimization solution from an outside optimizer when that solution is available. The Hessian matrix provides an approximation of a local (short-term) objective function, such as on a minute-to-minute basis. The outside optimization solution can be obtained when steady-state of the processes is established and can be used to provide directional guidance in how to modify the solution path to a final optimal position.

A third option could calculate the optimal solution to be implemented as a combination of the SQP solution calculated by the integration bridge 154 and the steady-state or offline optimization solution calculated by an outside optimizer. For example, the integration bridge 154 could identify a conjugate vector of the SQP solution calculated by the integration bridge 154 and the steady-state or offline optimization solution calculated by an outside optimizer. Conjugate weights can be used as a parameter to provide vision tuning to the process.

These different options could be used in different circumstances. For example, when the current control solution is close to an optimal solution, the first option could be selected. If the current control solution is far away from an optimal solution, the second option could be selected. The third option could be used if it is unclear whether the SQP solution from the integration bridge 154 or the optimization solution from the outside optimizer is correct. As another example, when performing continuous optimization, the first option may be preferred. When starting a process (such as during a "cold start"), the second or third option could be selected depending on whether the SQP solution and the optimization solution show solutions in different directions. In particular embodiments, heuristics or other techniques could be used for automatically selecting one of the options.

Although FIGS. 3A and 3B illustrate examples of methods for real-time sequential quadratic programming in an industrial process control system, various changes could be made to FIGS. 3A and 3B. For example, while shown as a series of steps, various steps in each figure could overlap, occur in parallel, occur in a different order, or occur multiple times.

Figure 4:
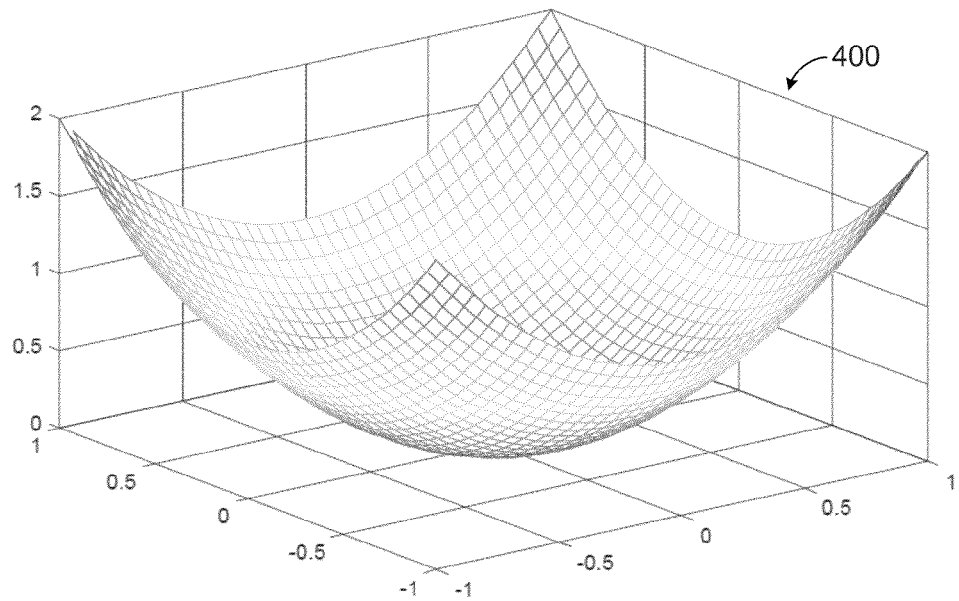
FIGS. 4 through 6 illustrate an example use of real-time sequential quadratic programming in an industrial process control system according to this disclosure.
Figure 5:
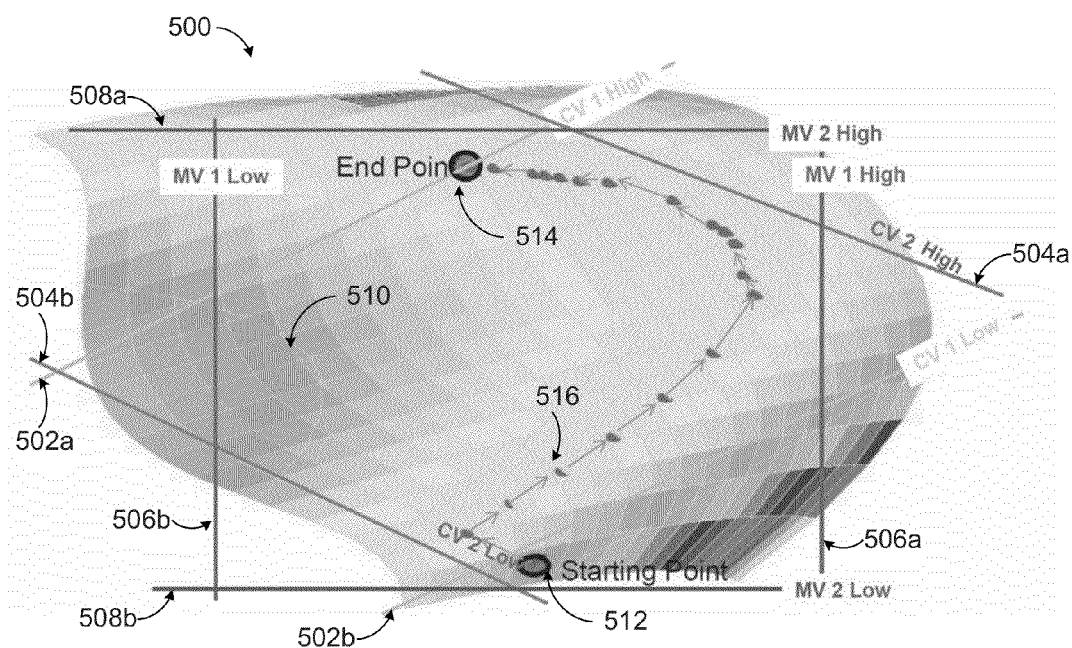
Figure 6:
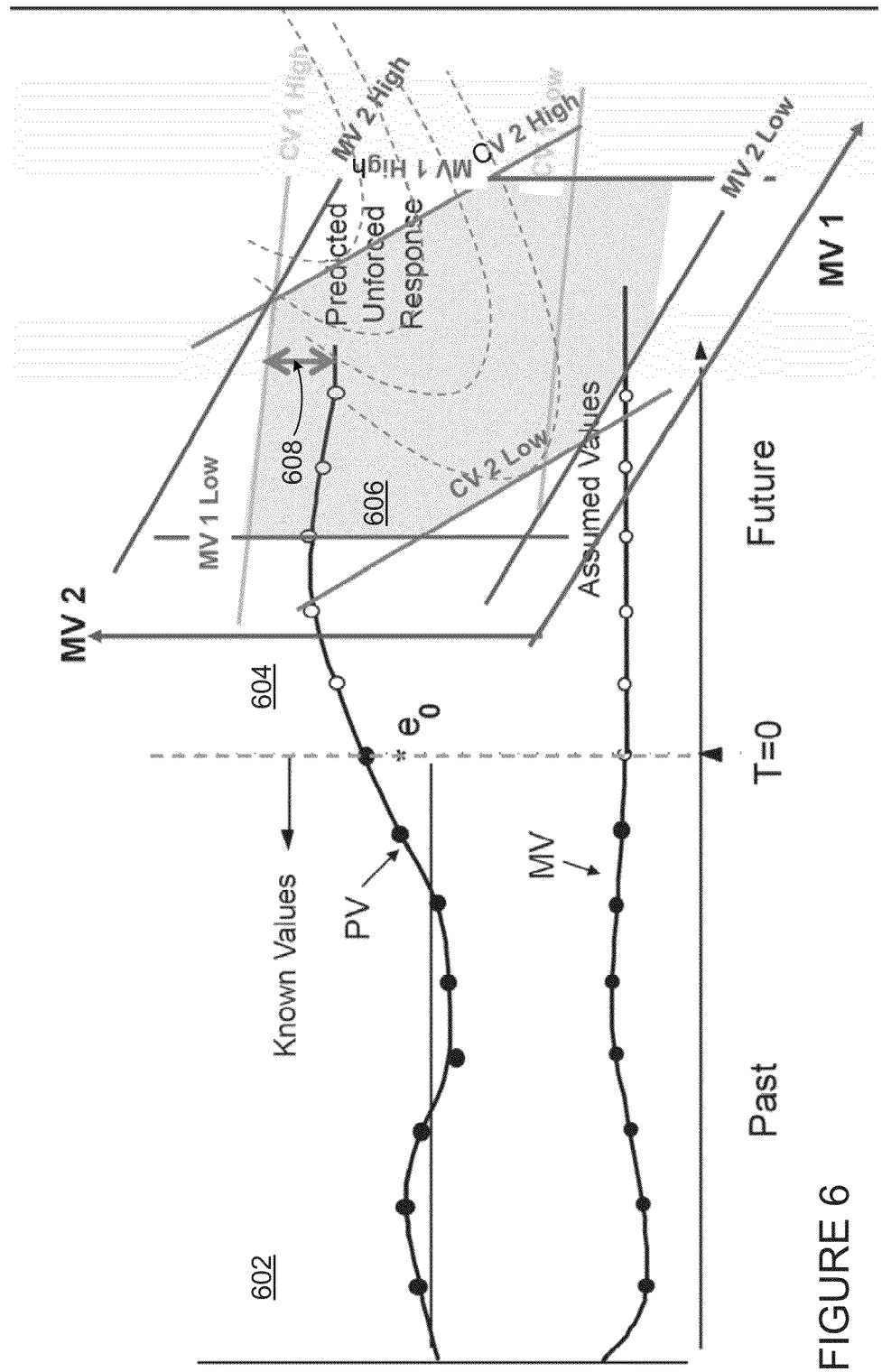

FIGS. 4 through 6 illustrate an example use of real-time sequential quadratic programming in an industrial process control system according to this disclosure. FIG. 4 illustrates an example graphical representation 400 of a Hessian matrix. The Hessian matrix represents an approximation of system nonlinearity. As noted above, the Hessian matrix can be generated or updated by the integration bridge 154 and passed to at least one APC controller. This can be done during each of repeating control intervals, such as during each iteration of the method 300.

FIG. 5 illustrates an example graphical representation 500 of a real-time sequential QP solution. In this example, it is assumed that there are two controlled variables CV1 and CV2 and two manipulated variables MV1 and MV2. A manipulated variable generally denotes a process variable that can be adjusted. A controlled variable generally denotes a process variable that is measured and controlled (by changing one or more manipulated variables) so that the controlled variable is maintained to a specified value or within specified limits. An example of this is when an amount of a valve's opening (a manipulated variable) is used to control a flow rate (a controlled variable). In contrast, a disturbance variable generally denotes a variable that can affect a controlled variable and that can be considered but not controlled, such as ambient temperature or atmospheric pressure.

As shown in FIG. 5, these variables have associated high and low limits. For example, lines 502a-502b are associated with the high and low limits of the CV1 variable, and lines 504a-504b are associated with the high and low limits of the CV2 variable. Similarly, lines 506a-506b are associated with the high and low limits of the MV1 variable, and lines 508a-508b are associated with the high and low limits of the MV2 variable.

In this example, a surface 510 represents an approximation of the nonlinear system being controlled. The surface 510 can be defined by the Hessian matrix and can be updated during each iteration of the method 300. The components of the control system generally function to adjust an operating point from a starting position 512 to an optimal ending position 514. This is accomplished by moving the operating point to multiple intermediate points 516 between the starting position 512 and the ending position 514. The process of moving the operating point in sequence like this gives rise to the name "sequential" quadratic programming. Each intermediate point 516 can be identified using the method 300 of FIG. 3. That is, in each iteration of the method 300, the surface 510 can be updated, and a change to one or more manipulated variables can be identified to move the operating point towards the ending position 514.

As can be seen here, there are virtually an unlimited number of possible paths that could be followed between the starting position 512 and the ending position 514. The specific path taken could depend, for example, on which option is used during step 358. That is, the specific path can depend on whether the APC controller receives:

- a Hessian matrix (or an update to a Hessian matrix) along with additional constraints from the nonlinear model 206;
- a Hessian matrix (or an update to a Hessian matrix) along with the actual optimization solution from an outside optimizer (when available); or
- a conjugate vector of the SQP solution calculated by the integration bridge 154 and the actual optimization solution calculated by an outside optimizer.

However the path is calculated, this approach helps to keep the control solution within a feasibility region defined by the various lines 502a-508b. That is, the operating point moves into the feasibility region quickly and remains there even as the operating point changes over numerous iterations. This illustrates the benefits of performing both control and optimization operations within an APC controller.

As shown in FIG. 6, time is divided into two periods 602-604 at a time T=0. Period 602 represents prior time for which actual process variable values are known, and period 604 represents future time for which process variable values are predicted.

In FIG. 6, a feasibility region 606 resides within various lines associated with high and low limits of variables CV1, CV2, MV1, and MV2. Note that these limits are different from those shown in FIG. 5. Within the feasibility region 606, a prediction is made at five mean time constants in the future (at "five tau"). Using this prediction, an estimate 608 can be made identifying the potential room between the predicted process variable value and a high limit.

Note that in FIG. 6, the system being controlled is not in steady-state since a process variable is oscillating around a setpoint. However, the system can still make predictions about future process variable values and use those predictions during optimization operations.

Although FIGS. 4 through 6 illustrate one example use of real-time sequential quadratic programming in an industrial process control system, various changes may be made to FIGS. 4 through 6. For example, the graphical representation 400 shown in FIG. 4 is for illustration only and can have any other suitable shape depending on the nonlinearity of the system being controlled. Also, the graphical representation 500 shown in FIG. 5 is for illustration only, and other control moves could be used to change the operating point of a process. In addition, FIG. 6 illustrates one example of identifying potential room for optimization for a specific set of circumstances.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a nonlinear model used by an optimizer to perform optimization operations associated with an industrial process to be controlled;
   generating a Hessian matrix associated with the nonlinear model;
   providing the Hessian matrix to an advanced process controller configured to use the Hessian matrix to perform both process control and optimization operations; and
   using an optimization solution collar to resolve dynamic conflicts between the optimizer and the advanced process controller.

2. The method of claim 1, wherein the Hessian matrix approximates a nonlinear objective function.

3. The method of claim 2, further comprising:
   generating an approximation of one or more nonlinear constraints associated with the nonlinear model; and
   providing the one or more approximated nonlinear constraints to the advanced process controller.

4. The method of claim 2, further comprising:
   generating a quadratic sub-problem that approximates the nonlinear model;
   obtaining an optimization solution to the quadratic sub-problem from the optimizer; and
   providing the optimization solution to the advanced process controller.

5. The method of claim 2, further comprising:
   generating a quadratic sub-problem that approximates the nonlinear model;

generating a first solution to the quadratic sub-problem using sequential quadratic programming;
obtaining a second solution to the quadratic sub-problem from the optimizer;
combining the first and second solutions to generate a combined solution; and
providing the combined solution to the advanced process controller.

6. The method of claim 5, wherein the combined solution comprises a conjugate vector of the first and second solutions.

7. The method of claim 1, further comprising:
updating the Hessian matrix and providing the updated Hessian matrix to the advanced process controller during each of multiple iterations; and
during each iteration, adjusting the industrial process to move an operating point of the industrial process towards an optimal ending position.

8. The method of claim 1, wherein generating the Hessian matrix comprises performing a Quasi-Newton method.

9. A method comprising:
identifying a nonlinear model used by an optimizer to perform optimization operations associated with an industrial process to be controlled;
generating a Hessian matrix associated with the nonlinear model; and
providing the Hessian matrix to an advanced process controller configured to use the Hessian matrix to perform both process control and optimization operations;
wherein the advanced process controller is configured to perform frequency-zero quadratic programming (QP) operations.

10. The method of claim 9, further comprising:
resolving dynamic conflicts between the optimizer and the advanced process controller.

11. An apparatus comprising:
at least one memory configured to store a nonlinear model used by an optimizer to perform optimization operations associated with an industrial process to be controlled; and
at least one processing device configured to:
generate a Hessian matrix associated with the nonlinear model; and
provide the Hessian matrix to an advanced process controller configured to use the Hessian matrix to perform both process control and optimization operations;
wherein the at least one processing device is further configured to update the Hessian matrix and provide the updated Hessian matrix to the advanced process controller during each of multiple iterations.

12. The apparatus of claim 11, wherein the Hessian matrix approximates a nonlinear objective function.

13. The apparatus of claim 12, wherein the at least one processing device is further configured to:
generate an approximation of one or more nonlinear constraints associated with the nonlinear model; and
provide the one or more approximated nonlinear constraints to the advanced process controller.

14. The apparatus of claim 12, wherein the at least one processing device is further configured to:
generate a quadratic sub-problem that approximates the nonlinear model;
obtain an optimization solution to the quadratic sub-problem from the optimizer; and
provide the optimization solution to the advanced process controller.

15. The apparatus of claim 12, wherein the at least one processing device is further configured to:
generate a quadratic sub-problem that approximates the nonlinear model;
generate a first solution to the quadratic sub-problem using sequential quadratic programming;
obtain a second solution to the quadratic sub-problem from the optimizer;
combine the first and second solutions to generate a combined solution; and
provide the combined solution to the advanced process controller.

16. A non-transitory computer readable medium embodying a computer program, the computer program comprising computer readable program code that when executed causes at least one processing device to:
identify a nonlinear model used by an optimizer to perform optimization operations associated with an industrial process to be controlled;
generate a Hessian matrix associated with the nonlinear model, wherein the Hessian matrix approximates a nonlinear objective function;
provide the Hessian matrix to an advanced process controller configured to use the Hessian matrix to perform both process control and optimization operations;
generate an approximation of one or more nonlinear constraints associated with the nonlinear model; and
provide the one or more approximated nonlinear constraints to the advanced process controller.

17. A non-transitory computer readable medium embodying a computer program, the computer program comprising computer readable program code that when executed causes at least one processing device to:
identify a nonlinear model used by an optimizer to perform optimization operations associated with an industrial process to be controlled;
generate a Hessian matrix associated with the nonlinear model, wherein the Hessian matrix approximates a nonlinear objective function;
provide the Hessian matrix to an advanced process controller configured to use the Hessian matrix to perform both process control and optimization operations;
generate a quadratic sub-problem that approximates the nonlinear model;
obtain an optimization solution to the quadratic sub-problem from the optimizer; and
provide the optimization solution to the advanced process controller.

18. A non-transitory computer readable medium embodying a computer program, the computer program comprising computer readable program code that when executed causes at least one processing device to:
identify a nonlinear model used by an optimizer to perform optimization operations associated with an industrial process to be controlled;
generate a Hessian matrix associated with the nonlinear model, wherein the Hessian matrix approximates a nonlinear objective function;
provide the Hessian matrix to an advanced process controller configured to use the Hessian matrix to perform both process control and optimization operations;
generate a quadratic sub-problem that approximates the nonlinear model;
generate a first solution to the quadratic sub-problem using sequential quadratic programming;
obtain a second solution to the quadratic sub-problem from the optimizer;

combine the first and second solutions to generate a combined solution; and provide the combined solution to the advanced process controller.

19. The apparatus of claim 11, wherein the at least one processing device is further configured to resolve dynamic conflicts between the optimizer and the advanced process controller.

20. The non-transitory computer readable medium of claim 16, wherein the computer program further comprises computer readable program code that when executed causes the at least one processing device to:

update the Hessian matrix and provide the updated Hessian matrix to the advanced process controller during each of multiple iterations.

* * * * *